US012803031B2

(12) United States Patent
Aono et al.

(10) Patent No.: US 12,803,031 B2
(45) Date of Patent: Nov. 17, 2026

(54) FUEL CELL STACK

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP); Takenori Koyanagi, Susono (JP)

(73) Assignee: TOYOTA BOSHOKU KABUSHIKI KAISHA

( * ) Notice: Subject to any disclaimer, the term of this patent is extended or adjusted under 35 U.S.C. 154(b) by 733 days.

(21) Appl. No.: 18/210,835

(22) Filed: Jun. 16, 2023

(65) Prior Publication Data

US 2023/0411666 A1 Dec. 21, 2023

(51) Int. Cl.

| | |
|---|---|
| ***H01M 8/2483*** | (2016.01) |
| ***H01M 8/04119*** | (2016.01) |
| ***H01M 8/10*** | (2016.01) |

(52) U.S. Cl.

CPC ..... *H01M 8/2483* (2016.02); *H01M 8/04156* (2013.01); *H01M 2008/1095* (2013.01)

(58) Field of Classification Search

CPC ........... H01M 8/04156; H01M 8/2483; H01M 2008/1095

See application file for complete search history.

(56) References Cited

U.S. PATENT DOCUMENTS

| | | | | |
|---|---|---|---|---|
| 2009/0142632 | A1* | 6/2009 | Owejan ................. | H01M 8/248 429/129 |
| 2011/0081593 | A1* | 4/2011 | Yamaura ............. | H01M 8/2485 429/459 |
| 2019/0097244 | A1* | 3/2019 | Oyama ............... | H01M 8/0206 |
| 2019/0214656 | A1 | 7/2019 | Ishida et al. | |

FOREIGN PATENT DOCUMENTS

| | | |
|---|---|---|
| JP | 5366635 B2 | 12/2013 |
| JP | 2019-121562 | 7/2019 |

* cited by examiner

*Primary Examiner* — Sathavaram I Reddy
(74) *Attorney, Agent, or Firm* — Greenblum & Bernstein, P.L.C.

(57) ABSTRACT

A fuel cell stack includes power generation cells stacked in a vertical direction and a discharge passage defining member extending in the vertical direction. Each of the power generation cells includes a gas hole. The gas holes of the power generation cells define a gas manifold which extends in the vertical direction and through which gas flows. Part of an upper wall surface of the gas manifold includes a water collection portion configured to collect water from the upper wall surface. The discharge passage defining member is located below the water collection portion of the gas manifold and defines a discharge passage out of which the water dropping from the water collection portion is discharged.

3 Claims, 4 Drawing Sheets

FUEL CELL STACK

BACKGROUND

1. Field

The present disclosure relates to a fuel cell stack.

2. Description of Related Art

Japanese Laid-Open Patent Publication No. 2019-121562 discloses a conventionally known example of a fuel cell stack. Such a fuel cell stack is formed by horizontally stacking rectangular power generation cells. Each power generation cell includes an electrolyte membrane electrode assembly with a resin frame, a first metal separator, and a second metal separator. The first and second metal separators sandwich the electrolyte membrane electrode assembly with the resin frame. The electrolyte membrane electrode assembly includes a solid polymer electrolyte membrane, an anode electrode, and a cathode electrode. The anode and cathode electrodes sandwich the solid polymer electrolyte membrane.

The fuel cell stack includes a gas manifold extending horizontally and a drain (passage) extending horizontally below the gas manifold. The gas manifold and the drain extend through the power generation cells. The gas manifold and the drain connect to each other at one end in the horizontal direction. The drain causes generated water produced during operation of the fuel cell stack to be discharged.

In the fuel cell stack, the gas manifold and the drain extend horizontally to connect to each other at the end. Further, the gas manifold is located above the drain. Thus, even if the fuel cell stack is operated so that its temperature becomes relatively high, most of the water vapor contained in the gas in the gas manifold does not flow into the drain.

When the operation of the fuel cell stack is stopped so that its temperature becomes relatively low, water vapor is condensed in the gas manifold. This produces liquid water in the gas manifold. When liquid water is produced in the gas manifold, the liquid water flows into a pipe or the like connected to the gas manifold. The liquid water flowed into the pipe or the like may freeze in, for example, a cold climate area. Thus, a valve or the like disposed in the pipe may malfunction. Accordingly, it is desired that the liquid water produced through the condensation of water vapor in the gas manifold is able to be discharged.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fuel cell stack that solves the above problem includes power generation cells configured to generate power using gas and stacked in a vertical direction and a discharge passage defining member extending in the vertical direction and having an annular cross-sectional shape. Each of the power generation cells includes a support frame that supports a membrane electrode assembly and two separators that sandwich the support frame. Each of the power generation cells includes a gas hole. The gas holes of the power generation cells define a gas manifold which extends in the vertical direction and through which the gas flows. Part of an upper wall surface of the gas manifold includes a water collection portion configured to collect water from the upper wall surface. The discharge passage defining member is located below the water collection portion of the gas manifold and defines a discharge passage out of which the water dropping from the water collection portion is discharged.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

The term "annular" as used in this description may refer to any structure that forms a loop, or a continuous shape with no ends. "Annular" shapes include but are not limited to a circular shape, an elliptic shape, and a polygonal shape with sharp or rounded corners.

A fuel cell stack 11 according to an embodiment will now be described with reference to the drawings.

Fuel Cell Stack 11

Figure 1:
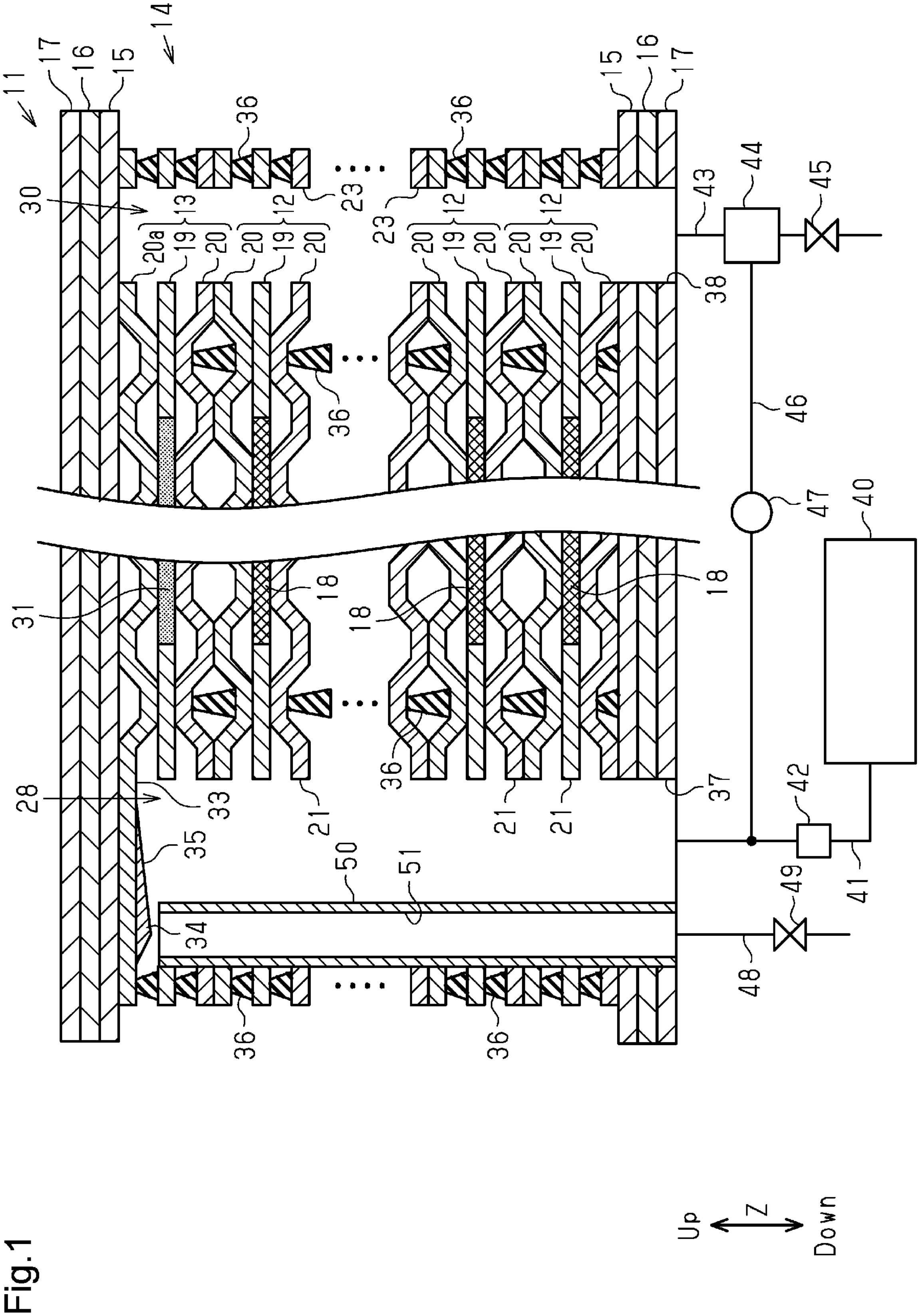
FIG. 1 is a cross-sectional view of a fuel cell stack according to an embodiment.

As shown in FIG. 1, the fuel cell stack 11 includes a cell stack body 14. In the cell stack body 14, rectangular power generation cells 12 and one rectangular dummy cell 13 are stacked in their thickness direction. Each power generation cell 12 generates power using fuel gas containing hydrogen and oxidant gas containing oxygen. The dummy cell 13 does not generate power. The power generation cells 12 and the dummy cell 13 are stacked in a vertical direction Z.

The dummy cell 13 is stacked on a power generation cell 12 that is located at an upper end of the stacked power generation cells 12. That is, the dummy cell 13 is located at an upper end of the cell stack body 14. End plates 17 are disposed at upper and lower ends of the cell stack body 14, respectively. The end plates 17 are stacked on respective insulating plates 16, which are stacked on respective terminal plates 15.

Power Generation Cell 12

Figure 2:
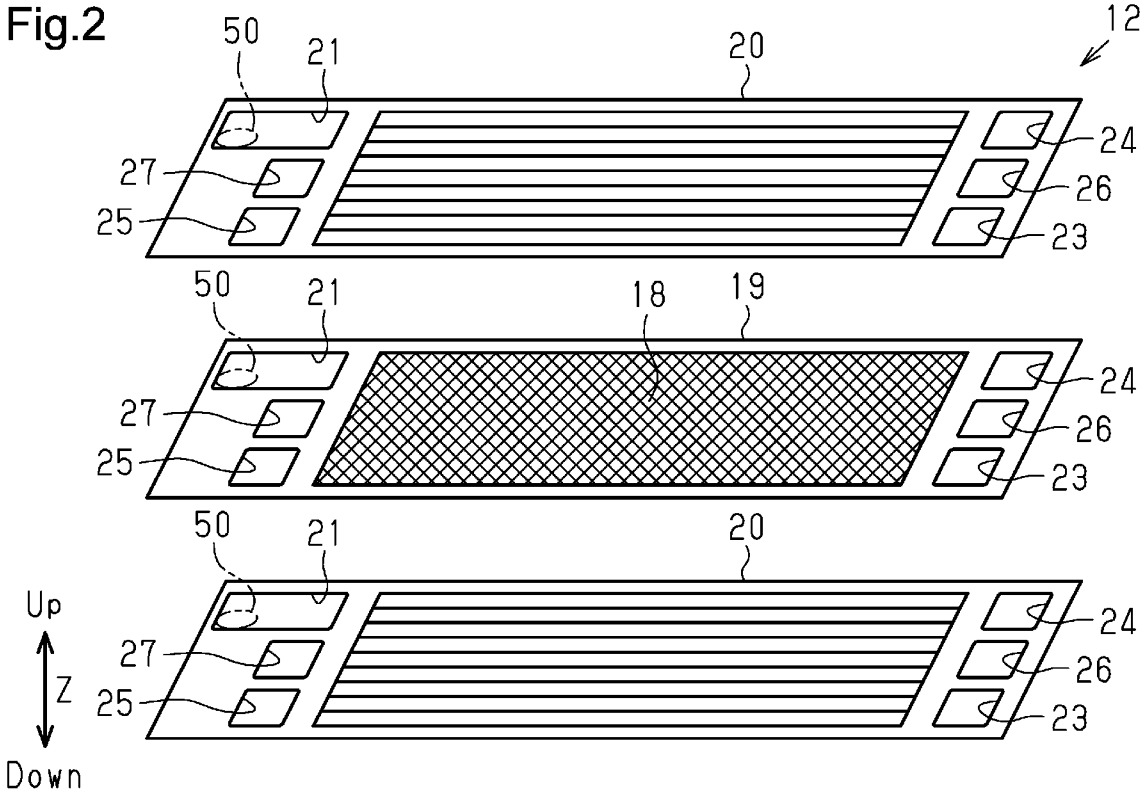
FIG. 2 is an exploded perspective view of a power generation cell.

As shown in FIGS. 1 and 2, each power generation cell 12 includes a synthetic resin support frame 19 that supports a membrane electrode assembly (MEA) 18, which is a rectangular sheet, and two metal separators 20. The support frame 19 has a frame shape to support the membrane electrode assembly 18 at a middle opening of the support frame 19. The two separators 20 sandwich the membrane electrode assembly 18 and the support frame 19 in the vertical direction Z.

When a portion of the membrane electrode assembly 18 at one end (anode side) in the vertical direction Z is supplied with fuel gas, and a portion of the membrane electrode assembly 18 at the other end (cathode side) is supplied with oxidant gas, each power generation cell 12 generates power from an electrochemical reaction of the fuel gas and the oxidant gas in the membrane electrode assembly 18. Multiple (six in this example) holes extend through the opposite ends of the power generation cell 12 in the longitudinal direction (i.e., the opposite ends of each support frame 19 and each separator 20 in the longitudinal direction).

These six holes are a fuel gas supply hole 21, a fuel gas discharge hole 23, an oxidant gas supply hole 24, an oxidant gas discharge hole 25, a cooling medium supply hole 26, and a cooling medium discharge hole 27. The fuel gas supply hole 21 is an example of a gas hole. The fuel gas supply hole 21 is broader than the other holes of the power generation cell 12 in the longitudinal direction of the power generation cell 12. The fuel gas supply holes 21 of the power generation cells 12 define a fuel gas supply passage 28, which extends in the vertical direction Z and is an example of a gas manifold. The fuel gas supply passage 28 is supplied with fuel gas, which is an example of gas.

The fuel gas discharge holes 23 of the power generation cells 12 define a fuel gas discharge passage 30 which extends in the vertical direction Z and out of which fuel gas is discharged. The oxidant gas supply holes 24 of the power generation cells 12 define an oxidant gas supply passage (not shown) that extends in the vertical direction Z and is supplied with oxidant gas. The oxidant gas discharge holes 25 of the power generation cells 12 define an oxidant gas discharge passage (not shown) which extends in the vertical direction Z and out of which oxidant gas is discharged.

The cooling medium supply holes 26 of the power generation cells 12 define a cooling medium supply passage (not shown) that extends in the vertical direction Z and is supplied with cooling medium (e.g., coolant). The cooling medium discharge holes 27 of the power generation cells 12 define a cooling medium discharge passage (not shown) which extends in the vertical direction Z and out of which a cooling medium is discharged. The fuel gas discharge passage 30, the oxidant gas supply passage (not shown), the oxidant gas discharge passage (not shown), the cooling medium supply passage (not shown), and the cooling medium discharge passage (not shown) are narrower than the fuel gas supply passage 28 in the longitudinal direction of the power generation cell 12.

Dummy Cell 13

Figure 3:
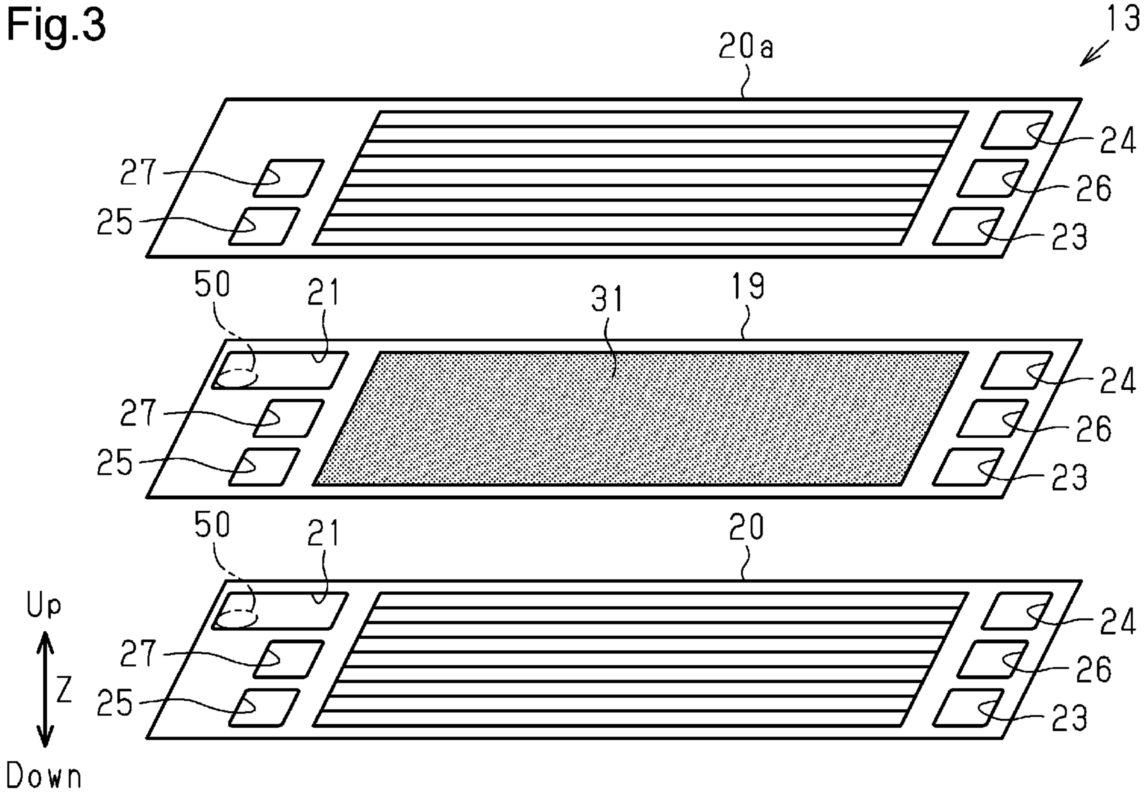
FIG. 3 is an exploded perspective view of a dummy cell.

As shown in FIGS. 1 and 3, the dummy cell 13 is a cell in which the membrane electrode assembly 18 of the power generation cell 12 is changed to a conductor 31, which is a rectangular sheet, and the upper separator 20 is changed to a dummy separator **20*a*. In the same manner as the power generation cell 12, the dummy cell 13 includes the lower separator 20. That is, the dummy cell 13 includes the support frame 19 supporting the conductor 31, the dummy separator 20*a*, and the separator 20. The support frame 19 supports the conductor 31 at a middle opening of the support frame 19. The support frame 19 of the dummy cell 13 supporting the conductor 31 is sandwiched by the dummy separator 20*a* and the separator 20** in the vertical direction Z.

The dummy separator **20*a* does not include the fuel gas supply hole 21, which is included in the separator 20 of the power generation cell 12, and includes a projection 34 located at part of a lower surface 33. Thus, other than these components, the dummy separator 20*a* has the same components as the separator 20. The dummy cell 13 does not include the membrane electrode assembly 18. Thus, the dummy cell 13 does not generate power even when supplied with fuel gas and oxidant gas. The lower surface 33 of the dummy separator 20*a* is an upper wall surface of the fuel gas supply passage 28**.

Projection 34 and Discharge Passage Defining Member 50

The projection 34 includes a water collection portion that collects water from the lower surface 33. The projection 34 is located at part of the lower surface 33 of the dummy separator **20*a* in the fuel gas supply passage 28. The end of an inner part of the fuel gas supply passage 28 opposite from the membrane electrode assembly 18 is provided with a tubular discharge passage defining member 50. The discharge passage defining member 50 extends in the vertical direction Z over substantially the entire fuel gas supply passage 28. The discharge passage defining member 50 is fixed to the inner part of the fuel gas supply passage 28** by a fixing portion (not shown).

The discharge passage defining member 50 is located below the projection 34 in the fuel gas supply passage 28. The discharge passage defining member 50 defines a discharge passage 51 into which water dropping from the projection 34 is discharged. The projection 34 has a triangular cross-section and includes an inclined surface 35 that becomes lower toward the discharge passage defining member 50. The lowest part of the inclined surface 35 corresponds to the discharge passage 51 in the vertical direction Z. The highest part of the inclined surface 35 corresponds to the end of the fuel gas supply passage 28 closer to the membrane electrode assembly 18. There is a slight gap between the upper end of the discharge passage defining member 50 and the lower end of the projection 34.

Connection Structure of Pipes in Fuel Cell Stack 11

As shown in FIG. 1, the fuel cell stack 11 includes gaskets 36, each sealing a section between the terminal plate 15 and the separator 20, a section between the support frame 19 and the separator 20, a section between the support frame 19 and the dummy separator **20*a*, and a section between the separators 20**.

A fuel gas supply port 37 and a fuel gas discharge port 38 extend through each of the terminal plate 15, the insulating plate 16, and the end plate 17 that are located at the lower end of the fuel cell stack 11. The lower end of the discharge passage defining member 50 is inserted into part of the fuel gas supply port 37. The fuel gas supply port 37 and the fuel gas discharge port 38 connect to the fuel gas supply passage 28 and the fuel gas discharge passage 30, respectively.

The fuel gas supply port 37 is connected to a gas supply pipe 41. The gas supply pipe 41 extends from a gas tank 40 that accommodates fuel gas. The gas supply pipe 41 includes a pressure regulating valve 42 that regulates the pressure of fuel gas supplied to the fuel gas supply port 37 through the gas supply pipe 41 from the gas tank 40.

The fuel gas discharge port 38 is connected to the upper end of a first discharge pipe 43 that extends in the vertical direction Z. Unreacted fuel gas containing moisture is discharged from the fuel gas discharge port 38 to the first discharge pipe 43. The first discharge pipe 43 includes a gas-liquid separator 44 and a first on-off valve 45. The gas-liquid separator 44 separates moisture from the unreacted fuel gas discharged out of the fuel gas discharge port 38.

In the first discharge pipe 43, the first on-off valve 45 is located below the gas-liquid separator 44. The first on-off valve 45 is normally closed, and is opened when the water separated from the unreacted fuel gas by the gas-liquid separator 44 is discharged. A coupling pipe 46 that extends in the horizontal direction couples a side part of the gas-liquid separator 44 to the gas supply pipe 41, between the pressure regulating valve 42 and the fuel gas supply port 37.

The coupling pipe 46 includes a pump 47 that delivers, toward the gas supply pipe 41, the unreacted fuel gas from which moisture has been separated by the gas-liquid separator 44. The lower end of the discharge passage defining member 50 is connected to the upper end of a second discharge pipe 48 that extends in the vertical direction Z. The discharge passage 51 in the discharge passage defining member 50 connects to the second discharge pipe 48. The second discharge pipe 48 includes a second on-off valve 49. The second on-off valve 49 is normally closed, and is opened when water accumulated in the discharge passage 51 and the second discharge pipe 48 is discharged.

An oxidant gas supply port (not shown) and an oxidant gas discharge port (not shown) extend through each of the terminal plate 15, the insulating plate 16, and the end plate 17 that are located at the lower end of the fuel cell stack 11. The oxidant gas supply port and the oxidant gas discharge port connect to the oxidant gas supply passage (not shown) and the oxidant gas discharge passage (not shown), respectively. The oxidant gas supply port and the oxidant gas discharge port are each connected to a pipe (not shown).

A cooling medium supply port (not shown) and a cooling medium discharge port (not shown) extend through each of the terminal plate 15, the insulating plate 16, and the end plate 17 that are located at the lower end of the fuel cell stack 11. The cooling medium supply port and the cooling medium discharge port connect to the cooling medium supply passage (not shown) and the cooling medium discharge passage (not shown), respectively. The cooling medium supply port and the cooling medium discharge port are each connected to a pipe (not shown).

Operation of Fuel Cell Stack 11

Figure 4:
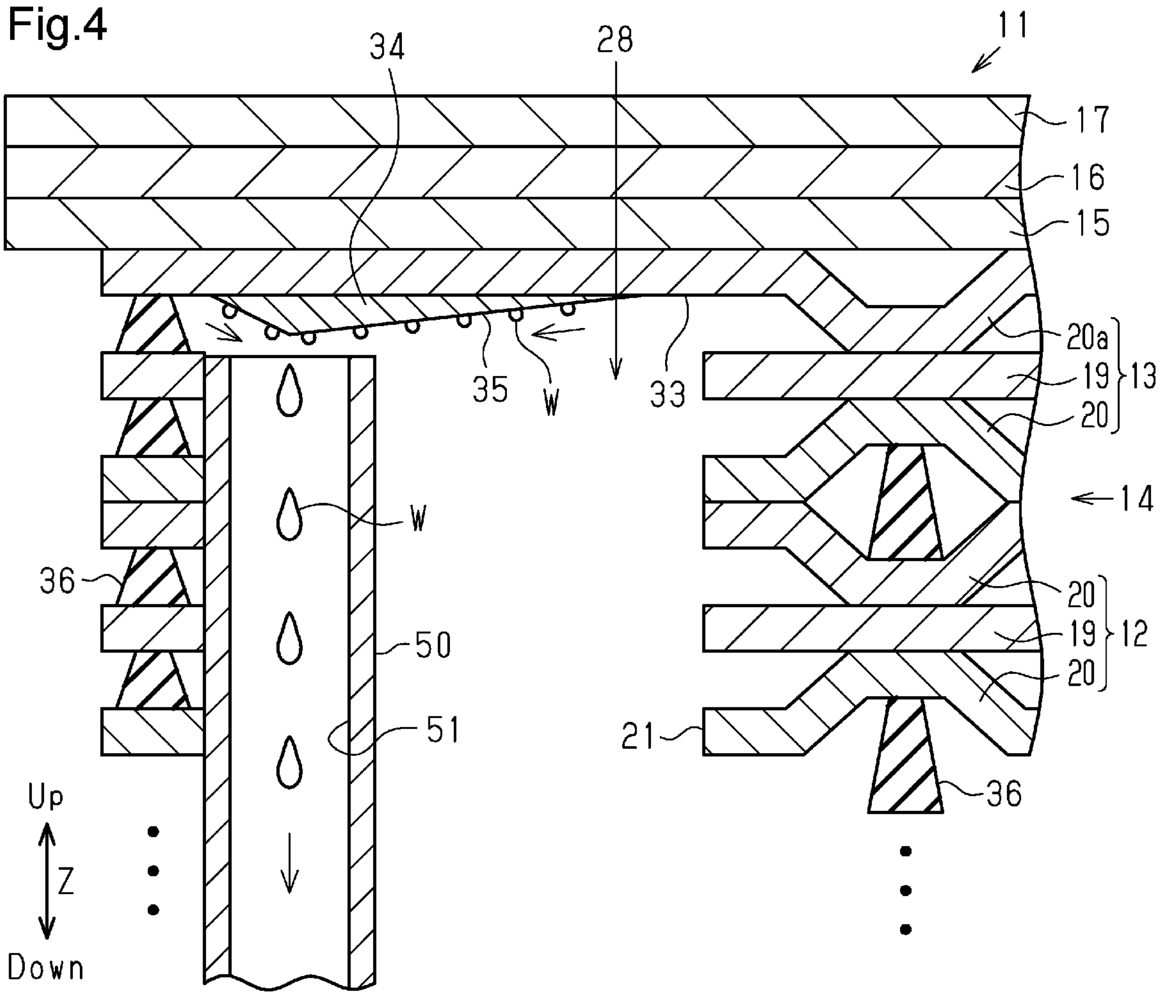
FIG. 4 is an enlarged view of the main part of the fuel cell stack shown in FIG. 1.

As shown in FIGS. 1 and 4, when power is generated in the fuel cell stack 11, fuel gas is supplied from the gas tank 40 through the gas supply pipe 41 and the fuel gas supply port 37 to the fuel gas supply passage 28. In this case, the pressure of the fuel gas supplied to the fuel gas supply passage 28 is regulated by the pressure regulating valve 42. The fuel gas supplied to the fuel gas supply passage 28 is supplied to anode-side surfaces of the membrane electrode assemblies 18 of the power generation cells 12, which are located below the dummy cell 13.

Oxidant gas is supplied to cathode-side surfaces of the membrane electrode assemblies 18 of the power generation cells 12 through the oxidant gas supply passage (not shown) from the oxidant gas supply port (not shown). Then, power is generated from the electrochemical reaction in the membrane electrode assemblies 18 between the oxidant gas supplied to the cathode-side surfaces of the membrane electrode assemblies 18 of the power generation cells 12 and the fuel gas supplied to the anode-side surfaces of the membrane electrode assemblies 18 of the power generation cells 12.

Unreacted fuel gas in the membrane electrode assemblies 18 contains moisture, and is discharged to the first discharge pipe 43 through the fuel gas discharge passage 30 and the fuel gas discharge port 38. The moisture of the water-containing unreacted fuel gas discharged to the first discharge pipe 43 is separated from the gas-liquid separator 44. Then, the pump 47 delivers the fuel gas to the gas supply pipe 41 through the coupling pipe 46. The unreacted fuel gas delivered to the gas supply pipe 41 is supplied again to the fuel gas supply passage 28 together with the fuel gas from the gas tank 40. Unreacted oxidant gas in the membrane electrode assemblies 18 is discharged from the oxidant gas supply port (not shown) through the oxidant gas discharge passage (not shown).

During the operation of the fuel cell stack 11, the fuel cell stack 11 has a relatively high temperature. Thus, the moisture in the fuel cell stack 11 is in a water vapor state. Particularly, the fuel gas supply passage 28 is supplied with fuel gas that contains moisture, and thus includes water vapor. In this case, since the opening of the upper end of the discharge passage defining member 50 is open, some of the water vapor in the fuel gas supply passage 28 flows into the discharge passage 51 from the opening of the upper end of the discharge passage defining member 50.

After the operation of the fuel cell stack 11 is stopped, the temperature of the fuel cell stack 11 decreases. Thus, the water vapor in the discharge passage 51 and the water vapor in the fuel gas supply passage 28 are condensed into liquid water W. The water vapor in the fuel gas supply passage 28 tends to be accumulated at the upper end of the fuel gas supply passage 28. Accordingly, the water vapor is condensed on the lower surface 33 and the inclined surface 35 of the dummy separator 20*a* into the liquid water W.

Then, gravity causes the liquid water W to run down the inclined surface 35 toward the discharge passage defining member 50 and fall into the discharge passage 51. Thus, the liquid water W produced through the condensation of the water vapor in the fuel gas supply passage 28 is discharged out of the discharge passage 51 smoothly. This reduces the amount of the liquid water W that drops from the lower surface 33 of the dummy separator 20*a* to the outside of the discharge passage defining member 50 of the fuel gas supply passage 28.

If the fuel cell stack 11 does not include the discharge passage defining member 50 (discharge passage 51), a larger amount of the liquid water W is produced through the condensation of water vapor in the fuel gas supply passage 28. As a result, gravity causes the liquid water W to flow into the gas supply pipe 41 through the fuel gas supply port 37 from the fuel gas supply passage 28.

Thus, if the fuel cell stack 11 is used in a place where the temperature is less than the freezing point (e.g., a cold climate area), the liquid water W that has flowed into the gas supply pipe 41 is frozen. This clogs the gas supply pipe 41 and freezes the pressure regulating valve 42. As a result, the supply of fuel gas from the gas tank 40 to the fuel gas supply passage 28 is limited. Consequently, it is difficult to start the fuel cell stack 11.

As described above, the fuel cell stack 11 of the present embodiment allows the liquid water W produced through the condensation of the water vapor in the fuel gas supply passage 28 to be discharged out of the discharge passage 51 smoothly. This reduces the amount of the liquid water W in the fuel gas supply passage 28 when the fuel cell stack 11 stops operating and its temperature decreases. Thus, gravity causes a lower amount of the liquid water W to flow into the gas supply pipe 41 through the fuel gas supply port 37 from the fuel gas supply passage 28.

Consequently, even if the fuel cell stack 11 is used in a place where the temperature is less than the freezing point (e.g., a cold climate area), situations in which the gas supply pipe 41 is clogged and the pressure regulating valve 42 is frozen due to freezing liquid water W are prevented. This improves the performance of starting the fuel cell stack 11 in a place where the temperature is less than the freezing point (e.g., a cold climate area).

The liquid water W accumulated in the discharge passage 51 is discharged out of the second discharge pipe 48 smoothly when the second on-off valve 49 is opened in a case in which the place where the fuel cell stack 11 is used has a temperature that does not freeze the liquid water W.

Advantage of Embodiment

The embodiment described above in detail has the following advantage.

(1) In the fuel cell stack 11, the power generation cells 12, which generate power using fuel gas, are stacked in the vertical direction Z. Each power generation cell 12 includes the support frame 19, which supports the membrane electrode assembly 18, and two separators 20, which sandwich the support frame 19. The power generation cells 12 respectively include the fuel gas supply holes 21 defining the fuel gas supply passage 28, which extends in the vertical direction Z and through which fuel gas flows. Part of the lower surface 33 of the dummy separator **20*a*, which is the upper wall surface of the fuel gas supply passage 28, includes the projection 34, which collects water from the lower surface 33. The projection 34 includes the inclined surface 35, which becomes lower toward the discharge passage defining member 50. The tubular discharge passage defining member 50, which extends in the vertical direction Z, is located below the projection 34 in the fuel gas supply passage 28. The discharge passage defining member 50 defines the discharge passage 51, out of which the liquid water W dropping from the projection 34** is discharged.

Normally, when the temperature of the fuel cell stack 11 decreases, some of the water vapor in the fuel gas supply passage 28 with the fuel cell stack 11 having a relatively high temperature is condensed into the liquid water W. The liquid water W collects on the lower surface 33 of the fuel gas supply passage 28. The liquid water W on the lower surface 33 of the fuel gas supply passage 28 drops and accumulates in the gas supply pipe 41, which is connected to the fuel gas supply passage 28. When the fuel cell stack 11 is used in a place where the temperature is less than the freezing point (e.g., a cold climate area), the liquid water W accumulated in the gas supply pipe 41 is frozen. This clogs gas supply pipe 41, for example. In the above configuration, gravity causes the liquid water W on the lower surface 33 of the fuel gas supply passage 28 to run down the inclined surface 35 of the projection 34 toward the discharge passage defining member 50. Then, the liquid water W drops into the discharge passage 51 of the discharge passage defining member 50 and is then discharged. Accordingly, the liquid water W produced through the condensation of the water vapor in the fuel gas supply passage 28 is discharged smoothly.

Modifications

The above embodiment may be modified as follows. The above embodiment and the following modifications can be combined as long as the combined modifications remain technically consistent with each other.

Figure 5:
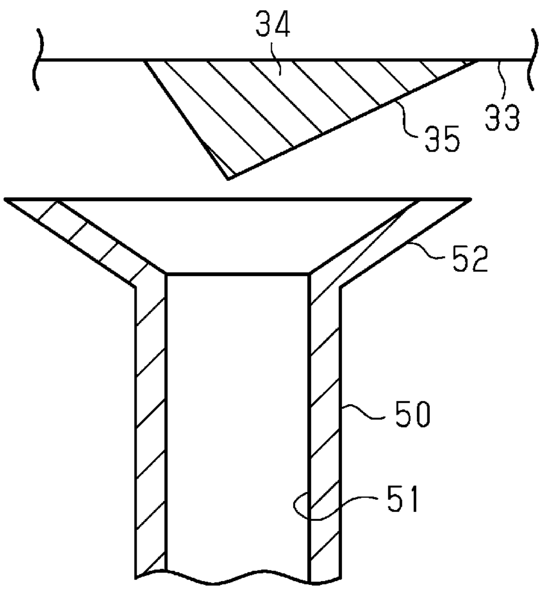
FIG. 5 is an enlarged cross-sectional view showing the main part of the fuel cell stack according to a modification.

As shown in FIG. 5, the upper end of the discharge passage defining member 50 may include a large-diameter portion 52 in which the diameter of the discharge passage 51 in the discharge passage defining member 50 is increased. This prevents the liquid water W dropping from the projection 34 from spilling from the discharge passage 51.

Figure 6:
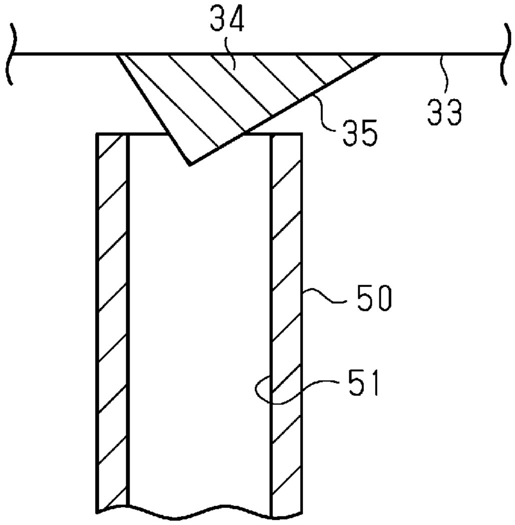
FIG. 6 is an enlarged cross-sectional view showing the main part of the fuel cell stack according to another modification.

As shown in FIG. 6, the lower end of the projection 34 may be inserted into the discharge passage 51 from the opening of the upper end of the discharge passage defining member 50. This further prevents the liquid water W dropping from the projection 34 from spilling from the discharge passage 51.

Figure 7:
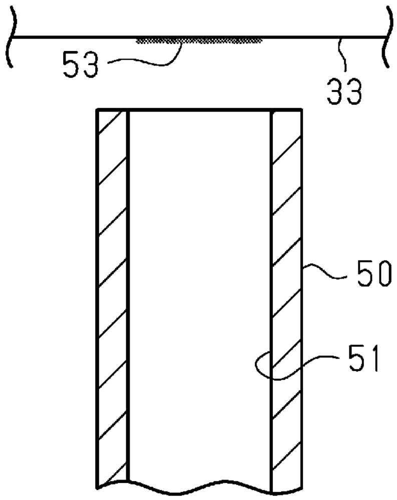
FIG. 7 is an enlarged cross-sectional view showing the main part of the fuel cell stack according to a further modification.

As shown in FIG. 7, the lower surface 33 of the fuel gas supply passage 28 may include a hydrophilic portion 53, which is an example of the water collection portion, instead of the projection 34. That is, the water collection portion may be the hydrophilic portion 53. The hydrophilic portion 53 is more hydrophilic than a portion of the lower surface 33 other than the hydrophilic portion 53. Specifically, the material of the portion of the lower surface 33 defining the hydrophilic portion 53 may be more hydrophilic than the material of the portion of the lower surface 33 other than the hydrophilic portion 53. Alternatively, the hydrophilic portion 53 may be provided by applying a coating material that is more hydrophilic than the material of the dummy separator **20*a* to part of the lower surface 33. In this configuration, when water vapor is condensed on the portion of the lower surface 33 other than the hydrophilic portion 53 into the liquid water W, the flow of the liquid water W toward the hydrophilic portion 53 is facilitated. The portion of the lower surface 33 other than the hydrophilic portion 53** may be water-repellent.

The projection 34 may be formed integrally with the lower surface 33 of the dummy separator **20*a*, or may be separate from the dummy separator 20*a* so that the projection 34 is attached to the lower surface 33 of the dummy separator 20*a***.

The projection 34 may be conical or pyramidal.

In each power generation cell 12, the fuel gas supply hole 21 may have any shape.

The inner and outer diameters of the discharge passage defining member 50 may be changed. The cross-sectional shape of the discharge passage defining member 50 does not have to be circular and may be, for example, oval or polygonal. That is, the discharge passage defining member 50 only needs to have an annular cross-sectional shape.

In the fuel cell stack 11, the gas used may be oxidant gas, the gas hole used may be the oxidant gas supply hole 24, and the gas manifold used may be the oxidant gas supply passage (not shown), which extends in the vertical direction Z and with which oxidant gas is supplied. Further, the projection 34 may be located on the upper wall surface of the oxidant gas supply passage, and the discharge passage defining member 50 may be located below the projection 34 in the oxidant gas supply passage. That is, the projection 34 and the discharge passage defining member 50 may be employed in the oxidant gas supply hole 24 as the gas manifold.

Alternatively, the projection 34 and the discharge passage defining member 50 may be employed in the fuel gas discharge passage 30 or the oxidant gas discharge passage (not shown) as the gas manifold.

The fuel cell stack 11 does not have to include the dummy cell 13. Instead of the lower surface 33 of the dummy separator 20*a*, the lower surface of the upper terminal plate may be used as the upper wall surface of the fuel gas supply passage 28 (gas manifold). In this case, the projection 34 is located on the lower surface of the upper terminal plate 15.

The fuel cell stack 11 may be used for a fuel cell system mounted on, for example, an electric vehicle or a hybrid electric vehicle. Alternatively, the fuel cell stack 11 may be used for a stationary fuel cell system arranged outdoors.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A fuel cell stack, comprising:

power generation cells configured to generate power using gas and stacked in a vertical direction; and a discharge passage defining member extending in the vertical direction and having an annular cross-sectional shape, wherein each of the power generation cells includes:

a support frame that supports a membrane electrode assembly; and two separators that sandwich the support frame, each of the power generation cells includes a gas hole, the gas holes of the power generation cells defining a gas manifold which extends in the vertical direction and through which the gas flows, part of an upper wall surface of the gas manifold includes a water collection portion configured to collect water from the upper wall surface, and the discharge passage defining member is located in the gas holes of the power generation cells and below the water collection portion, the discharge passage defining member defining a discharge passage out of which the water dropping from the water collection portion is discharged.

2. The fuel cell stack according to claim 1, wherein the water collection portion includes an inclined surface that becomes lower toward the discharge passage defining member.

3. The fuel cell stack according to claim 1, wherein the water collection portion includes a hydrophilic portion that is more hydrophilic than a portion of the upper wall surface other than the water collection portion.

* * * * *